United States Patent
Kim et al.

(10) Patent No.: US 11,845,423 B2
(45) Date of Patent: Dec. 19, 2023

(54) TURNING CONTROL SYSTEM OF VEHICLE AND TURNING CONTROL METHOD THEREOF

(71) Applicants: HYUNDAI MOTOR COMPANY, Seoul (KR); KIA MOTORS CORPORATION, Seoul (KR)

(72) Inventors: Sang Joon Kim, Seoul (KR); Jea Mun Lee, Seoul (KR); Jae Young Park, Seongnam-si (KR); Hui Un Son, Suwon-si (KR); Young Eun Kim, Uiwang-si (KR); Joon Young Park, Seoul (KR); Sung Hoon Yu, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 267 days.

(21) Appl. No.: 16/953,992

(22) Filed: Nov. 20, 2020

(65) Prior Publication Data

US 2022/0032911 A1    Feb. 3, 2022

(30) Foreign Application Priority Data

Jul. 28, 2020  (KR) ........................ 10-2020-0093749

(51) Int. Cl.
*B60W 30/045*    (2012.01)
*B60W 30/188*    (2012.01)
(Continued)

(52) U.S. Cl.
CPC ........ *B60W 30/045* (2013.01); *B60W 30/188* (2013.01); *B60W 40/072* (2013.01);
(Continued)

(58) Field of Classification Search
CPC ............. B60W 30/045; B60W 30/188; B60W 40/072; B60W 40/105; B60W 40/109;
(Continued)

(56) References Cited

U.S. PATENT DOCUMENTS

| 5,627,756 A | * | 5/1997 | Fukada | ................ G05D 1/0891 |
|---|---|---|---|---|
| | | | | 180/197 |
| 9,956,958 B2 | * | 5/2018 | Sakaguchi | .......... B60W 30/143 |

(Continued)

FOREIGN PATENT DOCUMENTS

| CN | 107848526 A | * | 3/2018 | .............. B60L 15/20 |
|---|---|---|---|---|
| CN | 111216792 B | * | 7/2021 | ......... B60R 16/0232 |

(Continued)

OTHER PUBLICATIONS

Gillespie, Fundamentals of Vehicle Dynamics, SAE, Chapter 6 "Steady-State Cornering" (Year: 1992).*

*Primary Examiner* — Shelley Chen
(74) *Attorney, Agent, or Firm* — LEMPIA SUMMERFIELD KATZ LLC

(57) ABSTRACT

A turning control system of a vehicle includes: a database storing road information; a sensor part to detect a steering angle of a vehicle, a wheel speed of the vehicle, whether the vehicle is accelerated, whether the vehicle is braking, and whether a speed gear of the vehicle is shifted; and a controller that determines whether the vehicle enters a turning section based on one or more pieces of the information detected by the sensor part and the road information stored in the database. In particular, when the vehicle is entering the turning section, the controller sets a target speed of the vehicle and controls a speed of the vehicle to be decelerated to the set target speed.

12 Claims, 6 Drawing Sheets

(51) Int. Cl.
*B60W 40/105* (2012.01)
*B60W 40/072* (2012.01)
*B60W 40/109* (2012.01)
*B60W 50/00* (2006.01)

(52) U.S. Cl.
CPC ........ *B60W 40/105* (2013.01); *B60W 40/109* (2013.01); *B60W 2050/0055* (2013.01); *B60W 2520/125* (2013.01); *B60W 2552/15* (2020.02)

(58) Field of Classification Search
CPC ... B60W 2050/0055; B60W 2520/125; B60W 2552/15
See application file for complete search history.

(56) References Cited

U.S. PATENT DOCUMENTS

| | | | | |
|---|---|---|---|---|
| 2005/0269876 A1* | 12/2005 | Higuchi | ................... | B60T 7/12 303/155 |
| 2008/0059037 A1* | 3/2008 | Isaji | ................... | B60W 40/072 701/93 |
| 2015/0210282 A1* | 7/2015 | Fairgrieve | ........... | F16H 61/0213 701/93 |
| 2016/0251014 A1* | 9/2016 | Tomiyama | .......... | B60W 30/143 701/96 |
| 2017/0072951 A1* | 3/2017 | Sakaguchi | .......... | B60W 30/143 |
| 2018/0056811 A1* | 3/2018 | Iwahana | ................ | H02P 23/30 |
| 2018/0222483 A1* | 8/2018 | Yoon | ................... | B60W 30/143 |
| 2018/0264971 A1* | 9/2018 | Lor | ....................... | B60L 15/20 |
| 2018/0348769 A1* | 12/2018 | Sato | ...................... | G05D 1/0214 |
| 2019/0084570 A1* | 3/2019 | Suzuki | ................. | B60W 50/06 |
| 2020/0377082 A1* | 12/2020 | Nassouri | .......... | B60W 30/0956 |
| 2022/0032911 A1* | 2/2022 | Kim | ................... | B60W 40/072 |

FOREIGN PATENT DOCUMENTS

| | | | | | |
|---|---|---|---|---|---|
| JP | 3116738 | B2 * | 12/2000 | ............ | B60T 8/1755 |
| JP | 2004066940 | A * | 3/2004 | ............ | B60T 8/171 |
| JP | 3627325 | B2 * | 3/2005 | ............ | B60T 8/1755 |
| JP | 3627328 | B2 * | 3/2005 | | |
| JP | 3999448 | B2 * | 10/2007 | ............ | B60K 28/16 |
| JP | 2012076621 | A * | 4/2012 | ......... | B60T 8/17557 |
| KR | 10-2024384 | B1 | 11/2019 | | |

* cited by examiner

TURNING CONTROL SYSTEM OF VEHICLE AND TURNING CONTROL METHOD THEREOF

CROSS REFERENCE TO RELATED APPLICATION

This application claims priority to and the benefit of Korean Patent Application No. 10-2020-0093749, filed on Jul. 28, 2020, the entire contents of which are incorporated herein by reference.

FIELD

The present disclosure relates to a turning control system of a vehicle and a turning control method thereof.

BACKGROUND

The statements in this section merely provide background information related to the present disclosure and may not constitute prior art.

When a vehicle is driving, in a situation in which a turning radius is large, such as entering and exiting a highway ramp or turning in left or right, an understeer phenomenon occurs and thus the vehicle may be pushed out of the turning radius. Specifically, when a speed of the vehicle is high, the understeer phenomenon may occur more significantly.

Conventionally, in order to prevent such a phenomenon, a technology for differently perform torque control on vehicle wheels through torque vectoring to allow the vehicle to maintain neutral steering has been developed. In addition, a technology for automatically decelerating a vehicle at the beginning portion of a turning section using an engine brake through continuously variable transmission (CVT) control in the vehicle of an internal combustion engine has been developed.

However, we have discovered that in the case of the torque vectoring, a separate device for torque distribution is required and thus increases manufacturing costs, and when deceleration is performed through the engine brake, only an instantaneous steering angle is considered so that accuracy of the deceleration control is degraded.

SUMMARY

The present disclosure proposes a turning control system of a vehicle, which determines a target speed in consideration of a turning characteristic of a vehicle using a driving motor of the vehicle and performs deceleration control before the vehicle enters a turning section to allow the vehicle to perform the stable turning.

According to one aspect of the present disclosure, a turning control system of a vehicle includes: a database storing road information; a sensor part configured to detect one or more among a steering angle of the vehicle, a wheel speed of the vehicle, whether the vehicle is accelerated, whether the vehicle is braking, and whether a gear of the vehicle is shifted; and a controller configured to determine whether the vehicle enters a turning section on the basis of one or more pieces of the information detected by the sensor part and the road information stored in the database and, when the vehicle is determined as entering the turning section, configured to set a target speed of the vehicle and control a speed of the vehicle to be decelerated to the set target speed.

The controller may include a determination part for determining whether the vehicle enters the turning section, a setting part for setting a target speed of the vehicle when the vehicle is determined as entering the turning section, a deceleration rate determination part for determining a deceleration rate of the vehicle based on a current speed of the vehicle detected by the sensor part and the target speed which is set in the setting part; and a speed controller for controlling the speed of the vehicle to be decelerated to reach the target speed according to the deceleration rate which is determined by the deceleration rate determination part.

The determination part may determine whether the vehicle enters the turning section on the basis of one or more pieces of information among information on the wheel speed of the vehicle, the steering angle, whether the vehicle is accelerated, whether the vehicle is braking, and whether the gear is shifted, which is detected by the sensor part, and curvature information on a road, which is stored in the database.

The setting part may set the target speed of the vehicle on the basis of an actual lateral acceleration of the vehicle derived based on a steady state turning equation, a target lateral acceleration of the vehicle, and the speed of the vehicle detected by the sensor part.

The setting part may estimate the actual lateral acceleration of the vehicle on the basis of an actual turning behavior characteristic value of the vehicle and derives the target lateral acceleration of the vehicle on the basis of a target turning behavior characteristic value of the vehicle.

The setting part may calculate an absolute value of a difference between the actual lateral acceleration of the vehicle and the target lateral acceleration of the vehicle, and determine whether the calculated absolute value is smaller than a preset value. When the calculated absolute value is smaller than the preset value, the setting part is configured to set the speed of the vehicle corresponding to the calculated absolute value as the target speed of the vehicle.

The setting part may correct the target speed of the vehicle by reflecting a gradient of the road.

The turning control system may further include a filter part configured to remove a high-frequency component of a speed signal.

The speed controller may include a feedback controller configured to allow the current speed of the vehicle to converge on the target speed; a torque limiter configured to limit a final demand torque, which is derived on the basis of a demand torque of the vehicle and a compensation torque value which should be compensated for through the feedback controller so as to allow the current speed of the vehicle to reach the target speed, to be less than or equal to a preset range; and a deceleration controller configured to drive a motor according to the derived final demand torque to control deceleration.

According to another aspect, there is provided a turning control method of a vehicle, which includes determining whether a vehicle enters a turning section; when the vehicle is determined as entering the turning section, setting a target speed of the vehicle; determining a deceleration rate of the vehicle on the basis of a current speed of the vehicle and the set target speed; and controlling a speed of the vehicle to be decelerated to reach the target speed.

The determining of whether the vehicle enters the turning section may determine whether the vehicle enters the turning section on the basis of one or more pieces of information among information on a wheel speed of the vehicle, a steering angle, whether the vehicle is accelerated, whether the vehicle is braking, and whether a gear is shifted, which is detected by a sensor part, and curvature information on a road, which is stored in a database.

When the vehicle is determined as entering the turning section, the setting of the target speed of the vehicle may set the target speed of the vehicle on the basis of an actual lateral acceleration of the vehicle derived based on a steady state turning equation, a target lateral acceleration of the vehicle, and the speed of the vehicle detected by the sensor part.

When the vehicle is determined as entering the turning section, the setting of the target speed of the vehicle may include reflecting a gradient of the road to correct the target speed of the vehicle.

The turning control method may further include removing a high-frequency component of a speed signal.

In one form, controlling the speed of the vehicle to be decelerated to reach the target speed may include: performing a feedback control to allow the current speed of the vehicle to converge on the target speed; calculating a final demand torque based on a demand torque of the vehicle and a compensation torque value allowing the current speed of the vehicle to reach the target speed; limiting the final demand torque to be less than or equal to a preset range; and driving a motor according to the final demand torque to control the deceleration of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
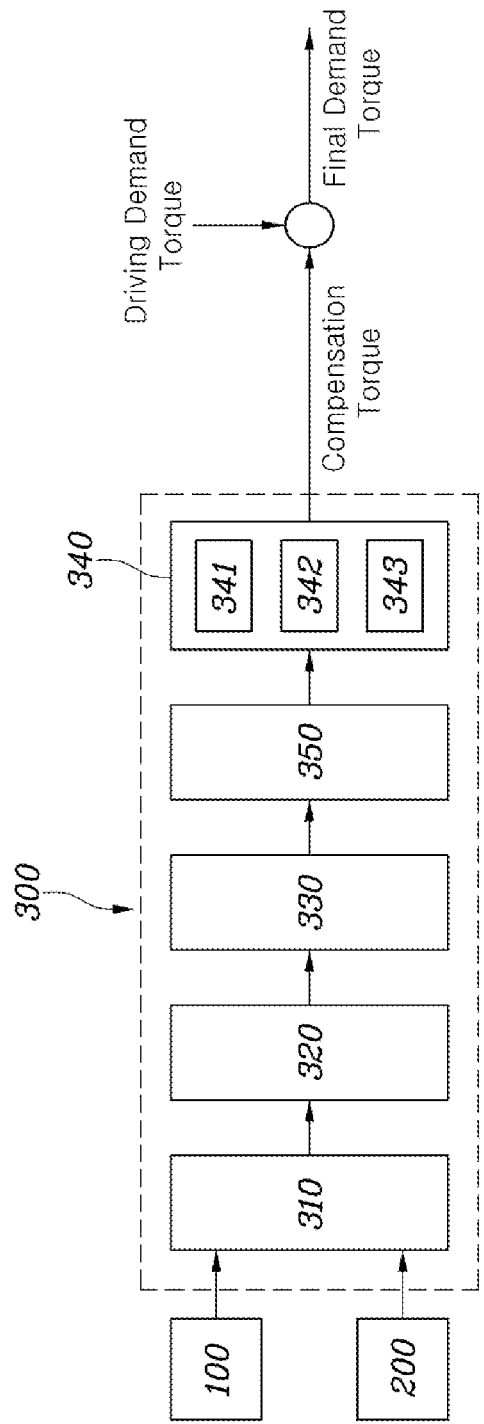
FIG. 1 is a schematic diagram illustrating an overall configuration of a turning control system of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a turning control system of a vehicle according to exemplary foams of the present disclosure will be described in detail with reference to the accompanying drawings.

Figure 2:
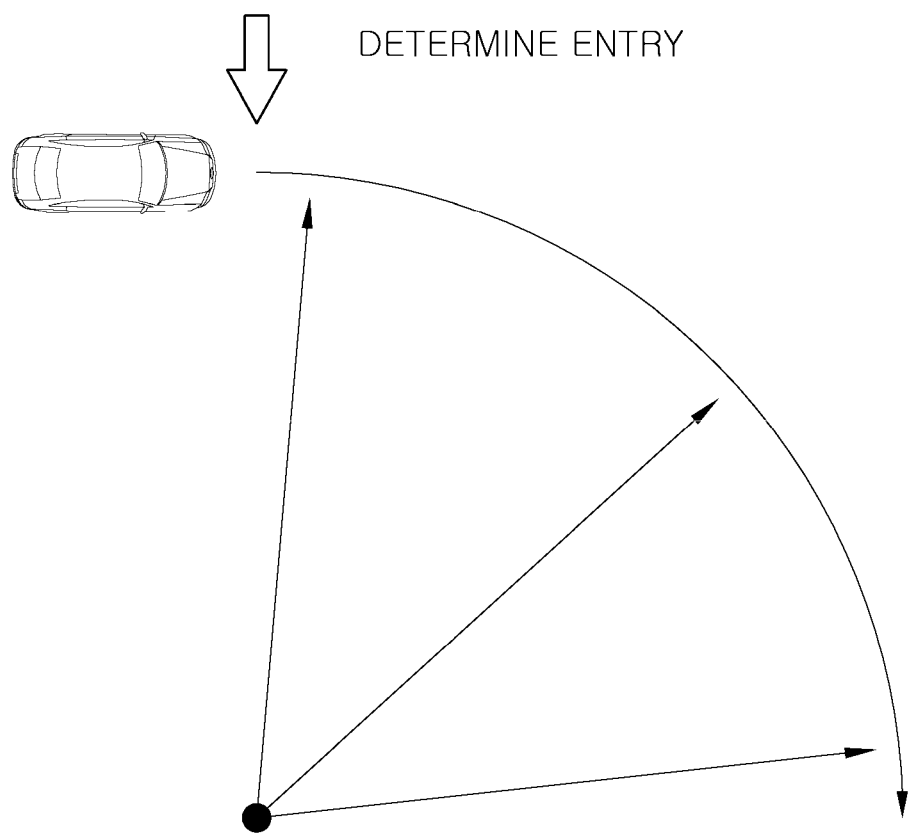
FIG. 2 is a diagram for describing determination of whether a vehicle enters a turning section in the turning control system of a vehicle according to one form of the present disclosure.
Figure 3:
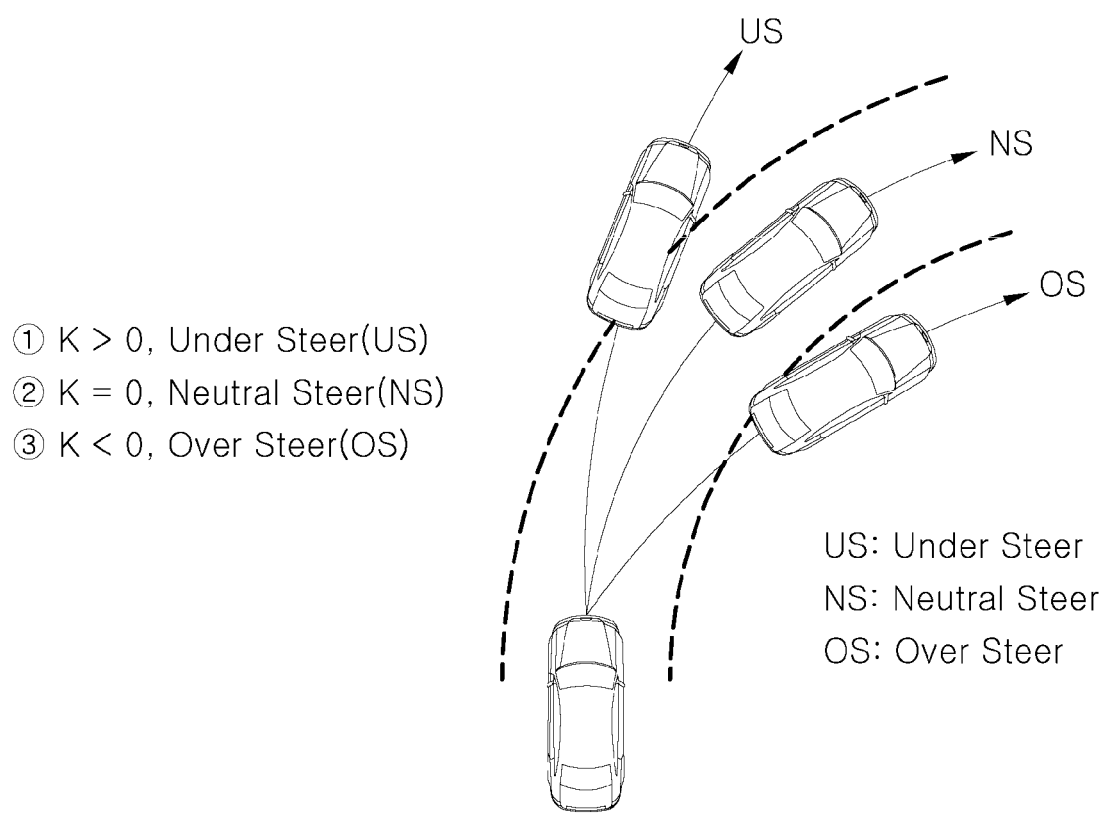
FIG. 3 is a diagram for describing a turning of the vehicle according to a turning behavior characteristic value in the turning control system of a vehicle according to one form of the present disclosure.
Figure 4:
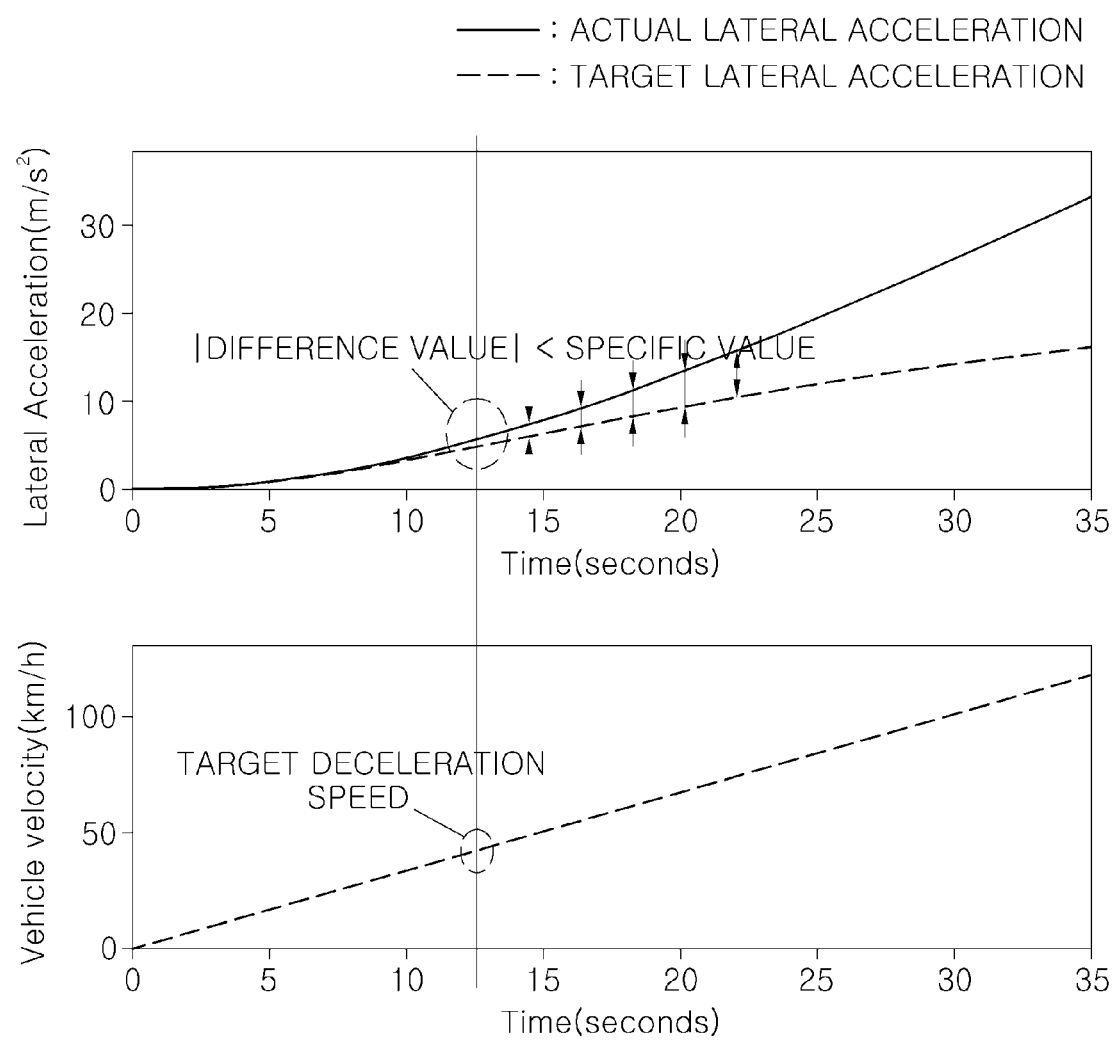
FIG. 4 shows graphs for describing a setting of a target speed of the vehicle in a setting part of the turning control system of a vehicle according to one form of the present disclosure.
Figure 5:
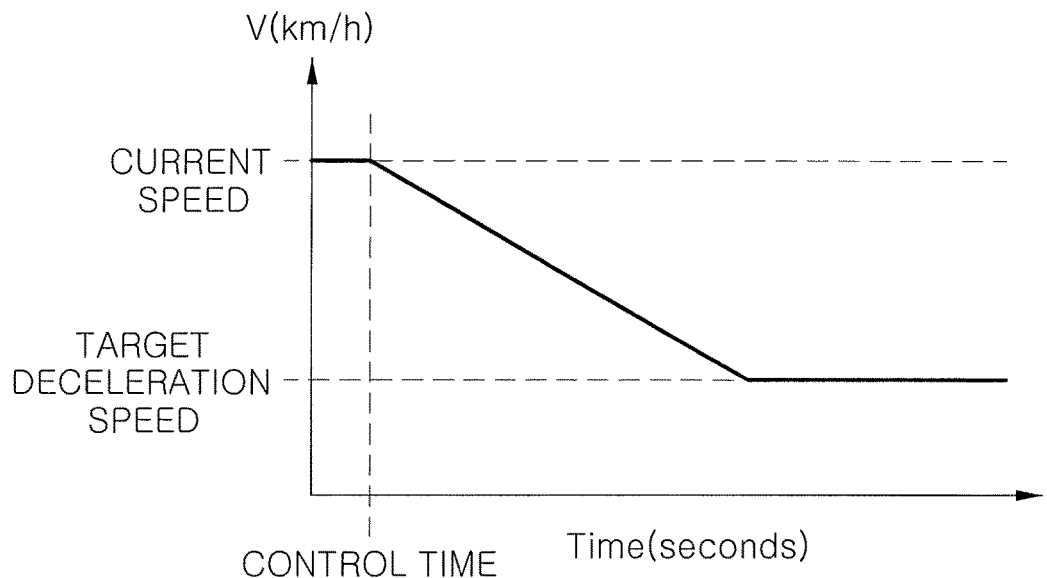
FIG. 5 is a graph showing that a speed of the vehicle is decelerated to a target speed through a speed controller of the turning control system of a vehicle according to one form of the present disclosure.
Figure 6:
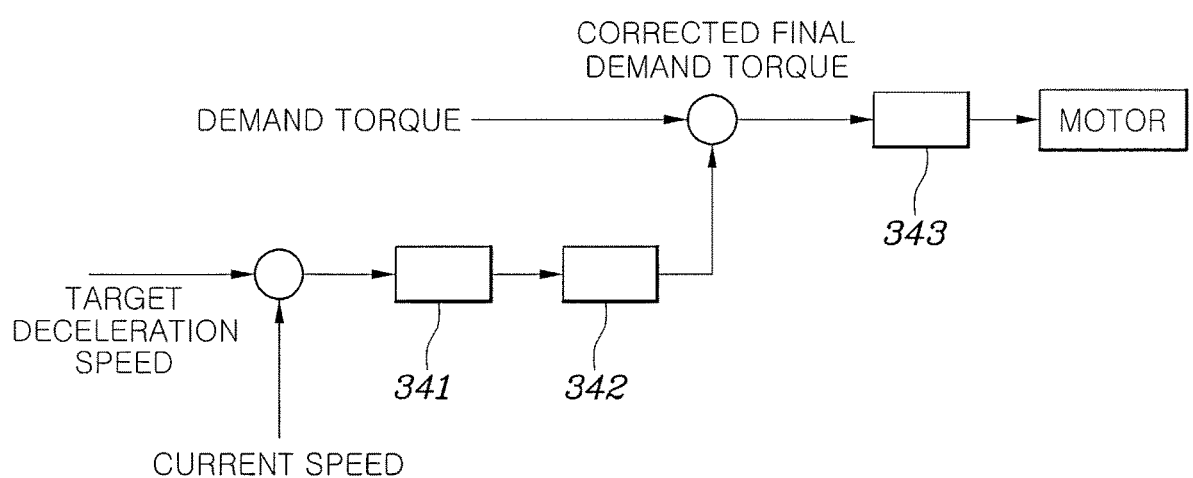
FIG. 6 is a diagram for describing that a final demand torque is derived from the speed controller of the turning control system of a vehicle according to one form of the present disclosure.

FIG. 1 is a schematic diagram illustrating an overall configuration of a turning control system of a vehicle according to one form of the present disclosure, FIG. 2 is a diagram for describing determination of whether a vehicle enters a turning section in the turning control system of a vehicle according to one form of the present disclosure, FIG. 3 is a diagram for describing a turning characteristic of the vehicle according to a turning behavior characteristic value in the turning control system of a vehicle according to one form of the present disclosure, FIG. 4 shows graphs for describing a setting of a target speed of the vehicle in a setting part of the turning control system of a vehicle according to one form of the present disclosure, FIG. 5 is a graph showing that a speed of the vehicle is decelerated to a target speed through a speed controller of the turning control system of a vehicle according to one form of the present disclosure, and FIG. 6 is a diagram for describing that a final demand torque is derived from the speed controller of the turning control system of a vehicle according to one form of the present disclosure.

Referring to FIG. 1, a turning control system of a vehicle according to one form of the present disclosure may include a database 100, a sensor part 200, and a controller 300.

Road information may be stored in the database 100. Here, the road information may include a curvature of a road, a gradient of a road, and a type of a road. However, this is merely one example, and the road information may include other road information which a driver should consider when driving the vehicle.

The turning control system of a vehicle according to one form of the present disclosure may include the sensor part 200. In one form, the sensor part 200 may include: at least one of a steering angle sensor for detecting a steering angle of the vehicle, a wheel speed sensor for detecting a wheel speed of the vehicle, an accelerator pedal sensor for detecting whether the vehicle is accelerated, a brake sensor for detecting whether the vehicle is braking, or a gear shift sensor for detecting whether a gear of the vehicle is shifted.

According to another form, the sensor part 200 may further include: a steering angle sensor for detecting a steering angle of the vehicle, a wheel speed sensor for detecting a wheel speed of the vehicle, an accelerator pedal sensor for detecting whether the vehicle is accelerated, a brake sensor for detecting whether the vehicle is braking, or a gear shift sensor for detecting whether a gear of the vehicle is shifted. As described above, when the sensor part 200 means one sensor, a plurality of sensor parts may be included in the turning control system of a vehicle according to the present disclosure. Detected information, which is detected by the sensor part 200, may be transmitted to the controller 300.

The controller 300 determines whether the vehicle enters a turning section on the basis of one or more pieces of the information detected by the sensor part 200 and the road information stored in the database 100 and, when the vehicle is determined as entering the turning section, the controller 300 may set a target speed of the vehicle and control the speed of the vehicle to be decelerated to the set target speed.

Specifically, the controller 300 may include a determination part 310 for determining whether the vehicle enters the turning section, a setting part 320 for setting a target speed of the vehicle when the vehicle is determined as entering the turning section, a deceleration rate determination part 330 for determining a deceleration rate of the vehicle based on a current speed of the vehicle detected by the sensor part 200 and the target speed which is set in the setting part 320, and a speed controller 340 for controlling the speed of the vehicle to be decelerated to reach the target speed according to the deceleration rate which is determined by the deceleration rate determination part 330.

In the turning control system of a vehicle according to one form of the present disclosure, the controller 300 may allow the vehicle to perform a turning control only in a specific situation. Specifically, when a steering angle which is input through the sensor part 200 is within a specific range, the controller 300 may perform the turning control. That is, when a detected steering angle is less than a specific value or exceeds the specific value, the controller 300 may prevent the turning control from being performed.

In addition, only when a speed of the vehicle is greater than or equal to a specific speed, the controller 300 may allow the turning control of the vehicle to be performed. That is, since an understeer phenomenon does not occur at an extremely low speed, only when the speed of the vehicle is at a medium or high speed that is greater than or equal to a predetermined speed, the controller 300 may allow the turning control to be performed.

In addition, when the vehicle is in a situation of acceleration or deceleration, the controller 300 may control to prevent the turning control from being performed.

Further, during a situation in which an anti-lock brake system (ABS) or a traction control system (TCS) should be operated or a gear shift situation, the controller 300 may control to prevent the turning control from being performed.

Meanwhile, the determination part 310 of the controller 300 determines whether the vehicle enters a turning section. Specifically, referring to FIG. 2, the determination part 310 may determine whether the vehicle enters a turning section on the basis of one or more pieces of information among information on a wheel speed of the vehicle, a steering angle, whether the vehicle is accelerated, whether the vehicle is braking, and whether a gear is shifted, which is detected by the sensor part 200, and curvature information on a road, which is stored in the database 100.

According to one form of the present form, when the curvature information on a road pre-stored in the database 100 is greater than or equal to a specific curvature value, the determination part 310 may determine that the vehicle enters the turning section.

According to another form, the determination part 310 may calculate a steering angle based on the curvature information on a road pre-stored in the database 100, and when the calculated steering angle is greater than or equal to a specific steering angle, the determination part 310 may determine that the vehicle enters the turning section.

According to still another form, the determination part 310 may determine that the vehicle enters the turning section on the basis of a steering angle value detected by the sensor part 200.

The setting part 320 may set the target speed of the vehicle on the basis of an actual lateral acceleration of the vehicle derived based on Equation 1 of a steady state turning below, a target lateral acceleration of the vehicle, and the speed of the vehicle detected by the sensor part 200.

$$\delta = \frac{L}{R} + \left(\frac{Mg}{C_{af}L}l_r - \frac{Mg}{C_{ar}L}l_f\right)\frac{V^2}{gR} = \frac{L}{R} + Ka_y \quad \text{[Equation 1]}$$

Here, δ means the steering angle means the steering angle, L means a wheel base, R means a turning radius, lr means a distance from the center of gravity to a rear wheel, lf means a distance from the center of gravity to a front wheel, M means a weight of the vehicle, g means acceleration of gravity, Caf means a front wheel turning rigidity coefficient, Car means a rear wheel turning rigidity coefficient, V means the speed of the vehicle, and K means a turning behavior characteristic value.

Specifically, the lateral acceleration of the vehicle may be derived through Equation 2 below.

$$a_y = \frac{V^2}{L + KV^2}\delta \quad \text{[Equation 2]}$$

Here, δ means the steering angle means the steering angle, L means the wheel base, V means the speed of the vehicle, K means the turning behavior characteristic value, and ay means the lateral acceleration.

Meanwhile, the turning behavior in the present disclosure is defined as a lateral acceleration of the vehicle which occurs when the steering angle is input. That is, the turning behavior may be the lateral acceleration of the vehicle which occurs due to a variation in steering angle of the vehicle. The turning behavior characteristic of the vehicle may be affected by the turning behavior characteristic value.

Specifically, referring to FIG. 3, when the turning behavior characteristic value is greater than zero, an understeer phenomenon may occur when the vehicle is turning, and when the turning behavior characteristic value is less than zero, an oversteer phenomenon may occur when the vehicle is turning, and when the turning behavior characteristic value is zero, the vehicle may stably turn during turning.

In other words, in order for a stable turning of the vehicle during turning, it is desired to set the turning behavior characteristic value to be close to zero.

Meanwhile, the setting part 320 may estimate the actual lateral acceleration of the vehicle on the basis of the actual turning behavior characteristic value of the vehicle as shown in Equation 3. In this case, the setting part 320 may derive the actual turning behavior characteristic value derived on the basis of the road information stored in the database 100 and the detected information, which is detected by the sensor part 200 and may estimate the actual lateral acceleration by substituting the derived actual turning behavior characteristic value into Equation 3 below.

$$\hat{a}_y = \left(\frac{1}{\tau s + 1}\right)\frac{V^2}{L + K_{veh}V^2}\delta \quad \text{[Equation 3]}$$

Here, δy means the estimated actual lateral acceleration, δ means the steering angle, V means the speed of the vehicle, Kveh means the actual turning behavior characteristic value, and • means a time constant.

In addition, the setting part 320 may derive a target lateral acceleration of the vehicle on the basis of the target turning behavior characteristic value of the vehicle as shown in Equation 4. In this case, the setting part 320 may set a target turning behavior characteristic value Kref to which a target turning behavior is reflected. According to one form, the setting part 320 may set the target turning behavior characteristic value such that weak understeer or weak oversteer occurs when the vehicle is turning, and then the setting part 320 may substitute the target turning behavior characteristic value into Equation 4 to derive the target lateral acceleration.

$$a_{y\_ref} = \frac{V^2}{L + K_{ref}V^2}\delta \quad \text{[Equation 4]}$$

Here, $\alpha_{y\_ref}$ means the target lateral acceleration, δ means the steering angle, V means the speed of the vehicle, Kref means the target turning behavior characteristic value, and means the steering angle.

The setting part 320 may set a speed when an absolute value of a difference between the actual lateral acceleration of the vehicle derived according to the above described method and the target lateral acceleration of the vehicle is smaller than a preset value as the target speed of the vehicle.

Specifically, referring to FIG. 4, it can be seen that, as the speed of the vehicle is increased at the same steering angle, the difference between the target lateral acceleration and the actual lateral acceleration is increased, and, as the speed of the vehicle is decreased, the difference between the target lateral acceleration and the actual lateral acceleration is decreased. The setting part 320 may set the speed of the vehicle when the absolute value of the difference between the derived actual lateral acceleration and the target lateral acceleration is smaller than a specific value as the target speed. For example, when the preset specific value is 0.5 m/s² and the speed of the vehicle is 50 km/h when the difference between the actual lateral acceleration and the target lateral acceleration is 0.5 m/s², the setting part 320 may set 50 km/h as the target speed of the vehicle.

Meanwhile, the setting part 320 may correct the target speed of the vehicle, which is set according to the above described method, by reflecting a gradient of a road. According to one form, when the road ahead is uphill, the setting part 320 may adjust the target speed to be high and, when the road ahead is downhill, the setting part 320 may adjust the target speed to be low.

The deceleration rate determination part 330 serves to determine the deceleration rate of the vehicle on the basis of a current speed of the vehicle, which is detected by the sensor part 200, and the target speed which is set by the setting part 320. Specifically, the deceleration rate determination part 330 may decelerate the speed of the vehicle according to the deceleration rate determined on the basis of the current speed of the vehicle and the target speed which is set by the setting part 320, thereby preventing sudden deceleration of the vehicle.

The filter part 350 serves to remove a high frequency component of a speed signal. According to another form, the filter part 350 may be a high pass filter (HPF). To describe with reference to FIG. 5, the filter part 350 removes the high frequency component from a signal of the current speed. Thus, when the current speed of the vehicle is decelerated according to the deceleration rate which is determined in the deceleration rate determination part 330, it is possible to prevent sudden deceleration of the vehicle.

That is, in the present disclosure, when the current speed is decelerated to the target speed, it is possible to prevent sudden deceleration of the vehicle through the deceleration rate determination part 330 and the filter part 350.

Meanwhile, the speed controller 340 may include a feedback controller 341 for controlling the current speed of the vehicle to converge on the target speed; a torque limiter 342 for limiting a final demand torque, which is derived on the basis of a demand torque of the vehicle and a compensation torque value which should be compensated for through the feedback controller 341 so as to allow the current speed of the vehicle to reach the target speed, to be less than or equal to a preset range; and a deceleration controller 343 for driving a motor according to the derived final demand torque to control deceleration.

Referring to FIG. 6, the feedback controller 341 may perform feedback control so as to allow the current speed of the vehicle to converge on the target speed. Here, the feedback controller 341 may be implemented of various types of controllers. In some forms, the feedback controller 341 may be implemented of a proportional-integral-derivative (PID) controller. However, this is merely one example, and, in addition to the above description, various types of controllers may be applied as the feedback controller 341 of the present disclosure.

The torque limiter 342 serves to limit the final demand torque, which is derived on the basis of the demand torque of the vehicle and the compensation torque value which should be compensated for through the feedback controller 341 so as to allow the current speed of the vehicle to reach the target speed, to be less than or equal to the preset range. Specifically, since the vehicle should not be accelerated due to the final demand torque, which is derived on the basis of the demand torque of the vehicle and the compensation torque value which should be compensated for through the feedback controller 341 so as to allow the current speed of the vehicle to reach the target speed, the torque limiter 342 may limit a magnitude of the final demand torque to be within the preset range, that is, a range in which the vehicle is not accelerated.

The deceleration controller 343 serves to drive the motor according to the final demand torque, which is derived through the feedback controller 341 and the torque limiter 342, to control the speed of the vehicle to be decelerated to the target speed. Specifically, the deceleration controller 343 may control the driving motor of the vehicle in a negative area to allow the speed of the vehicle to be decelerated to the target speed.

In the exemplary forms of the present disclosure, the controller 300 may be implemented through an algorithm configured to control operations of various components of the vehicle, a non-volatile memory (not shown) configured to store data relating to software commands to reproduce the algorithm, or at least one processor (not shown) configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

Figure 7:
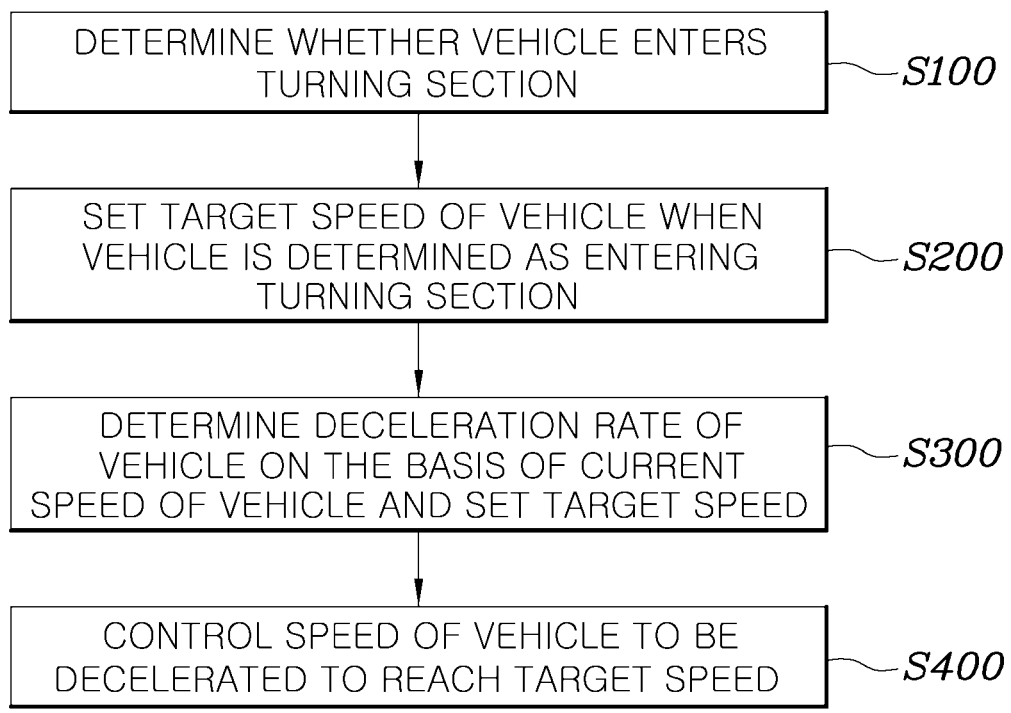
FIG. 7 is a flowchart illustrating a turning control method of a vehicle according to one form of the present disclosure.

FIG. 7 is a flowchart illustrating a turning control method of a vehicle according to one form of the present disclosure.

Referring to FIG. 7, the turning control method of a vehicle may include determining whether a vehicle enters a turning section, setting a target speed of the vehicle when the vehicle is determined as entering the turning section, determining a deceleration rate of the vehicle on the basis of a current speed of the vehicle and the set target speed, and controlling a speed of the vehicle to be decelerated to reach the target speed. According to the present disclosure, the method may further include removing a high frequency component of a speed signal.

Specifically, the determining of whether the vehicle enters the turning section may determine whether the vehicle enters a turning section on the basis of one or more pieces of information among information on a wheel speed of the vehicle, a steering angle, whether the vehicle is accelerated, whether the vehicle is braking, and whether a gear is shifted, which is detected by the sensor part 200, and curvature information on a road, which is stored in the database 100.

In addition, when the vehicle is determined as entering the turning section, the setting of the target speed of the vehicle may set the target speed of the vehicle on the basis of an actual lateral acceleration of the vehicle derived based on a steady state turning equation, a target lateral acceleration of the vehicle, and the speed of the vehicle detected by the sensor part 200.

In addition, when the vehicle is determined as entering the turning section, the setting of the target speed of the vehicle may include correcting the target speed of the vehicle by reflecting a gradient of a road.

Further, the controlling of the speed of the vehicle to be decelerated to reach the target speed may include performing feedback control to allow the current speed of the vehicle to converge on the target speed; limiting a final demand torque, which is derived on the basis of a demand torque of the vehicle and a compensation torque value which should be compensated for through the feedback control so as to allow the current speed of the vehicle to reach the target speed, to be less than or equal to a preset range; and driving a motor according to the derived final demand torque to control deceleration.

Since a specific technical feature of each operation in the turning control method of a vehicle according to one form of the present disclosure is the same as the above described technical feature of the turning control system of a vehicle according to one form of the present disclosure, a detailed description thereof will be omitted herein.

In accordance with the present disclosure, a target speed is determined using a driving motor of a vehicle in consideration of a turning characteristics of the vehicle, and deceleration control is performed before the vehicle enters a turning section such that a turning of the vehicle can be safely performed.

Although exemplary forms of the present disclosure have been described for illustrative purposes, those skilled in the art will appreciate that various modifications, additions and substitutions are possible, without departing from the scope and spirit of the present disclosure.

What is claimed is:

1. A turning control system of a vehicle, the turning control system comprising:
    a database configured to store road information;
    a sensor part configured to detect at least one of a steering angle of the vehicle, a wheel speed of the vehicle, whether the vehicle is accelerated, whether the vehicle is braking, and whether a gear of the vehicle is shifted; and
    a controller configured to:
        determine whether the vehicle enters a turning section based on one or more pieces of information detected by the sensor part and the road information stored in the database,
        when the vehicle is determined as entering the turning section, set a target speed of the vehicle, and
        control a speed of the vehicle to be decelerated to the target speed,
    wherein the controller includes:
        a deceleration rate determination part configured to determine a deceleration rate of the vehicle based on a current speed of the vehicle and the target speed, the sensor part configured to detect the current speed of the vehicle;
        a speed controller configured to decelerate the speed of the vehicle according to the deceleration rate until the vehicle reaches the target speed; and
        a setting part configured to set the target speed of the vehicle when the vehicle is determined as entering the turning section,
    wherein the setting part is configured to set the target speed of the vehicle based on an actual lateral acceleration of the vehicle derived based on a steady state turning equation, a target lateral acceleration of the vehicle, and the speed of the vehicle detected by the sensor part, and
    wherein the setting part is configured to: calculate an absolute value of a difference between the actual lateral acceleration of the vehicle and the target lateral acceleration of the vehicle, determine whether the calculated absolute value is smaller than a preset value, and when the calculated absolute value is smaller than the preset value, set the speed of the vehicle as the target speed of the vehicle.

2. The turning control system of claim 1, wherein the controller further includes:
    a determination part configured to determine whether the vehicle enters the turning section.

3. The turning control system of claim 2, wherein the determination part is configured to determine whether the vehicle enters the turning section based on one or more pieces of information among information on the wheel speed of the vehicle, the steering angle, whether the vehicle is accelerated, whether the vehicle is braking, and whether the gear is shifted, which is detected by the sensor part, and curvature information on a road, which is stored in the database.

4. The turning control system of claim 1, wherein the setting part is configured to estimate the actual lateral acceleration of the vehicle based on an actual turning behavior characteristic value of the vehicle and derive the target lateral acceleration of the vehicle based on a target turning behavior characteristic value of the vehicle.

5. The turning control system of claim 3, wherein the setting part is configured to correct the target speed of the vehicle based on a gradient of the road.

6. The turning control system of claim 2, further comprising:
    a filter part configured to remove a high-frequency component of a speed signal.

7. The turning control system of claim 2, wherein the speed controller includes:
    a feedback controller configured to allow the current speed of the vehicle to converge on the target speed;
    a torque limiter configured to limit a final demand torque to be less than or equal to a preset range, wherein the final demand torque is calculated based on a demand torque of the vehicle and a compensation torque value to allow the current speed of the vehicle to reach the target speed; and
    a deceleration controller configured to drive a motor based on the final demand torque to control the deceleration of the vehicle.

8. A turning control method of a vehicle, the turning control method comprising:
- determining whether a vehicle enters a turning section;
- in response to the vehicle entering the turning section, setting a target speed of the vehicle;
- determining a deceleration rate of the vehicle based on a current speed of the vehicle and the set target speed; and
- controlling a speed of the vehicle to be decelerated to reach the target speed according to the deceleration rate until the vehicle reaches the target speed,
- wherein the target speed of the vehicle is determined based on an actual lateral acceleration of the vehicle derived based on a steady state turning equation, a target lateral acceleration of the vehicle, and the speed of the vehicle detected by a sensor part, and
- wherein an absolute value of a difference between the actual lateral acceleration of the vehicle and the target lateral acceleration of the vehicle is calculated, whether the calculated absolute value is smaller than a preset value is determined, and when the calculated absolute value is smaller than the preset value, the speed of the vehicle is set as the target speed of the vehicle.

9. The turning control method of claim 8, wherein determining whether the vehicle enters the turning section is based on one or more pieces of information among information on a wheel speed of the vehicle, a steering angle, whether the vehicle is accelerated, whether the vehicle is braking, and whether a gear of the vehicle is shifted, which is detected by a sensor part, and curvature information on a road, which is stored in a database.

10. The turning control method of claim 8, wherein setting the target speed of the vehicle includes correcting the target speed of the vehicle based on a gradient of a road.

11. The turning control method of claim 8, wherein determining the deceleration rate of the vehicle includes removing a high-frequency component of a speed signal.

12. The turning control method of claim 8, wherein controlling the speed of the vehicle to be decelerated to reach the target speed includes:
- performing a feedback control to allow the current speed of the vehicle to converge on the target speed;
- calculating a final demand torque based on a demand torque of the vehicle and a compensation torque value allowing the current speed of the vehicle to reach the target speed;
- limiting the final demand torque to be less than or equal to a preset range; and
- driving a motor based on the final demand torque to control the deceleration of the vehicle.

* * * * *